(12) United States Patent
Sawano

(10) Patent No.: US 7,706,679 B2
(45) Date of Patent: Apr. 27, 2010

(54) APPARATUS AND METHOD FOR PHOTOGRAPHY, APPARATUS AND METHOD FOR SETTING WEIGHT, AND PROGRAMS THEREFOR

(75) Inventor: Tetsuya Sawano, Asaka (JP)

(73) Assignee: Fujifilm Corporation, Tokyo (JP)

( * ) Notice: Subject to any disclaimer, the term of this patent is extended or adjusted under 35 U.S.C. 154(b) by 867 days.

(21) Appl. No.: 11/356,381

(22) Filed: Feb. 17, 2006

(65) Prior Publication Data

US 2006/0188176 A1    Aug. 24, 2006

(30) Foreign Application Priority Data

Feb. 18, 2005    (JP)    ............... 2005-042055

(51) Int. Cl.
*G03B 17/24*    (2006.01)
(52) U.S. Cl. .................. 396/310; 348/231.2; 348/231.3
(58) Field of Classification Search ................ 396/310; 348/231.2, 231.3, 231.5, 231.6, 231.99
See application file for complete search history.

(56) References Cited

U.S. PATENT DOCUMENTS 6,177,956 B1 *   1/2001   Anderson et al. ...... 348/207.99
6,226,449 B1     5/2001   Inoue et al.
6,741,864 B2 *   5/2004   Wilcock et al. ......... 455/456.1
7,015,957 B2 *   3/2006   Romano et al. ......... 348/231.1
7,184,081 B1 *   2/2007   Miyake .................... 348/231.2
2005/0213790 A1 *  9/2005   Rhoads et al. ............... 382/100
2006/0082672 A1 *  4/2006   Peleg ..................... 348/333.01

FOREIGN PATENT DOCUMENTS

| JP | 10-4535 | 1/1998 |
| JP | 10-188533 | 7/1998 |
| JP | 2001-195869 | 7/2001 |

* cited by examiner

*Primary Examiner*—Rodney E Fuller
*Assistant Examiner*—Michael A Strieb
(74) *Attorney, Agent, or Firm*—McGinn IP Law Group, PLLC

(57) ABSTRACT

When an image obtained with use of a digital camera is deleted, deletion information including time and date of photography thereof is generated and recorded in a memory card. When an image obtained by photography is stored in the memory card, the deletion information is referred to, and a weight is set for the photographed image according to the number of deleted images photographed within a predetermined time before and/or after photography of the image, and added to the image.

11 Claims, 5 Drawing Sheets

2004/6/24    13:30:25
2004/6/24    14:05:10
2004/6/24    14:05:20
．
．
．

APPARATUS AND METHOD FOR PHOTOGRAPHY, APPARATUS AND METHOD FOR SETTING WEIGHT, AND PROGRAMS THEREFOR

BACKGROUND OF THE INVENTION

1. Field of the Invention

The present invention relates to a photography apparatus such as a digital camera and a photography method for obtaining an image by photography and for storing the image in a recording medium such as a memory card. The present invention also relates to a weight setting apparatus and a weight setting method for setting a weight of the image, and to programs for causing a computer to execute the photography method and the weight setting method.

2. Description of the Related Art

Unlike a conventional camera using a silver salt film, a digital camera stores images as digital data in a recording medium such as a memory card. Therefore, a large amount of images can be photographed with use of a digital camera. Furthermore, since a photographed image can be confirmed immediately after photography by display of the image on a liquid crystal display monitor, an unnecessary image such as a blurry image caused by unsuccessful photography can be deleted immediately from a recording medium. For this reason, photography is often carried out repeatedly until a user is satisfied, by confirming images immediately after photography.

A user of a digital camera tends to photograph similar scenes serially to store the images in a recording medium, since the user can delete the images later. In this case, the images are reproduced later and a necessary part of the images is selected from the similar scenes and the remaining unnecessary images are often deleted to save space in the recording medium.

Meanwhile, a method of recording time and date of insertion of characters and figures in a radiograph or the like has been proposed (see Japanese Unexamined Patent Publication No. 2001-195869). According to this method, editing operations can be carried out later with ease, by recording the time and date.

Since a digital camera allows repeated photography, images stored in a recording medium are those which have been saved by a user without deletion thereof. Therefore, the images are important to the user, and the user finds it convenient to be notified of an important image during display thereof, at the time of placing a printing order, for example.

SUMMARY OF THE INVENTION

The present invention has been conceived based on consideration of the above circumstances. An object of the present invention is therefore to enable easy indication of an image that is important to a user.

As has been described above, an image stored in a recording medium is important to a user, and images having been deleted are often included in the recording medium before and/or after photography of the image. The present invention pays attention to this fact.

More specifically, a photography apparatus of the present invention comprises:

imaging means for obtaining an image by photography;

storage means for storing the image;

input means for receiving an instruction to delete the image;

deletion means for deleting the image whose deletion has been instructed, from the storage means; and deletion information generation means for generating deletion information including the time and date of photography of the deleted image.

In the photography apparatus of the present invention, the deletion information generation means may generate the deletion information as a 0-byte hidden file.

The photography apparatus of the present invention may further comprise weight setting means for setting a weight regarding the photographed image according to the number of deleted images photographed before and/or after the time and date of photography of the image, with reference to the deletion information.

A weight setting apparatus of the present invention comprises weight setting means for setting the weight of the image obtained by photography with the photography apparatus of the present invention, according to the number of deleted images photographed before and/or after the time and date of photography of the image, with reference to the deletion information.

A photography method of the present invention comprises the steps of:

receiving an instruction to delete an image obtained by photography and stored in storage means;

deleting the image whose deletion has been instructed; and generating deletion information including time and date of photography of the deleted image.

A weight setting method of the present invention comprises the step of:

setting a weight of the image obtained through photography using the photography method of the present invention, according to the number of deleted images photographed before and/or after the time and date of photography of the image, with reference to the deletion information.

The photography method and the weight setting method of the present invention may be provided as programs for causing a computer to execute the methods.

The programs of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable colde, and can be in any language, including higher level languages, assembly language, and machine language.

According to the present invention, when an instruction to delete an image stored in the storage means is received, the image is deleted and the deletion information including the time and date of photography of the deleted image is generated. Therefore, by referring to the deletion information later, how many images were deleted before and/or after a stored image can be understood. If the number of deleted images is large, it is inferred that a user repeated photography until he/she was satisfied or that the user selected the best image from images of the same scene. Consequently, by generating the deletion information as in the present invention, the weight for the image can be set later according to the number of deleted images photographed before and/or after the image, with reference to the deletion information.

Furthermore, by setting the weight according to the number of deleted images photographed before and/or after the time and date of photography of the image with reference to the deletion information, the weight can also be displayed at the time of display of the image. Therefore, the user viewing the display can understand the weight of the image. Consequently, the user can easily make a decision as to whether printing needs to be ordered regarding the image, for example.

DESCRIPTION OF THE PREFERRED EMBODIMENT

Figure 1:
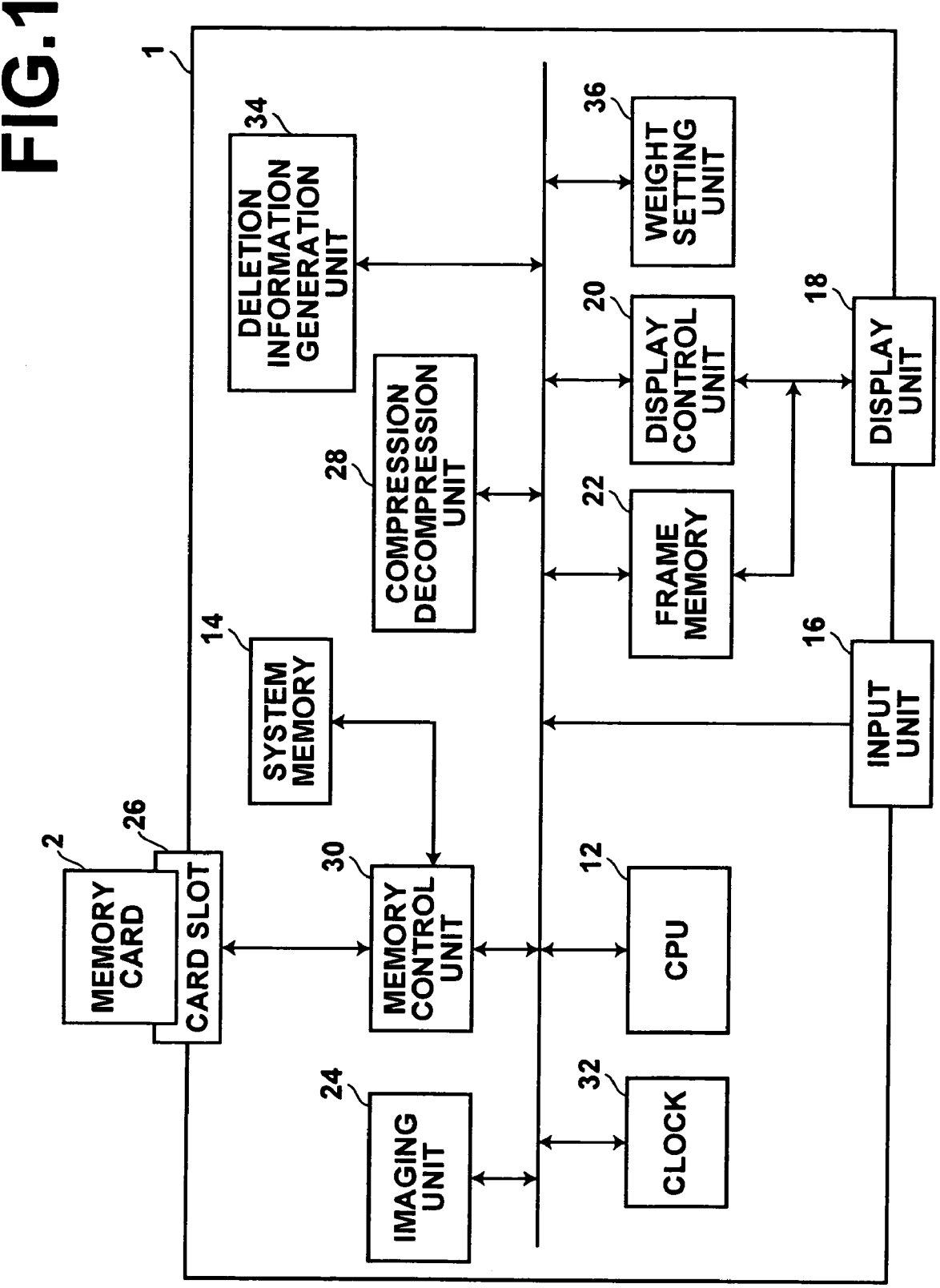
FIG. 1 is a block diagram showing the configuration of a digital camera adopting a photography apparatus of the present invention.

Hereinafter, an embodiment of the present invention will be described with reference to the accompanying drawings. FIG. 1 is a block diagram showing the configuration of a digital camera adopting a photography apparatus of the present invention. As shown in FIG. 1, a digital camera 1 in this embodiment comprises a CPU 12, a system memory 14, an input unit 16, a display unit 18, a display control unit 20, a frame memory 22, and an imaging unit 24. The CPU 12 carries out various kinds of control such as photography control, image storage control, and display control. The CPU 12 also controls each unit comprising the digital camera 1. The system memory 14 comprises a ROM for storing a program for operating the CPU 12 and various kinds of constants. The system memory 14 also comprises a RAM used as a workspace for processing by the CPU 12. The input unit 16 comprises a shutter button, a navigation key, and various kinds of buttons for inputting instructions to the digital camera 1. The display unit 18 comprises a liquid crystal display monitor or the like used for various kinds of display. The display control unit 20 controls the display unit 18. The frame memory 22 temporarily stores an image to be displayed on the display unit 18. The imaging unit 24 comprises a CCD, a photography lens, and the like for obtaining an image by photography.

The digital camera 1 also comprises a card slot 26 for reading an image from a memory card 2 and for storing an image obtained by photography in the memory card 2, a compression decompression unit 28 for compressing an image according to a method using JPEG, motion JPEG, and the like, and for decompressing the compressed image, a memory control unit 30 for controlling the system memory 14 and the card slot 26, and a clock 32 for measuring time.

The digital camera 1 further comprises a deletion information generation unit 34 for generating deletion information D0 including time and date of photography of an image deleted from the memory card 2 as will be described later, and a weight setting unit 36 for setting a weight for an image.

Figure 2:
FIG. 2 shows generation of deletion information.

The deletion information generation unit 34 generates a 0-byte hidden file as the deletion information D0 for the image deleted from the memory card 2, and stores the file in the memory card 2. More specifically, in the case where deletion is carried out on an image with a file name DSC0013.JPG whose photography time and date is 13:30:25 on Jun. 24, 2004 as shown in FIG. 2, the deletion information D0 is generated wherein the file name is changed to _DSC0013.JPG and only the photography time and date is stored. In the case where the number of deleted images is more than 1, file names of the hidden files therefor are given by incrementing the number to be given thereto, such as _DSC0014.JPG and _DSC0014_2.JPG. The deletion information generation unit 34 stores the deletion information D0 in the memory card 2.

Figures 3, 4:
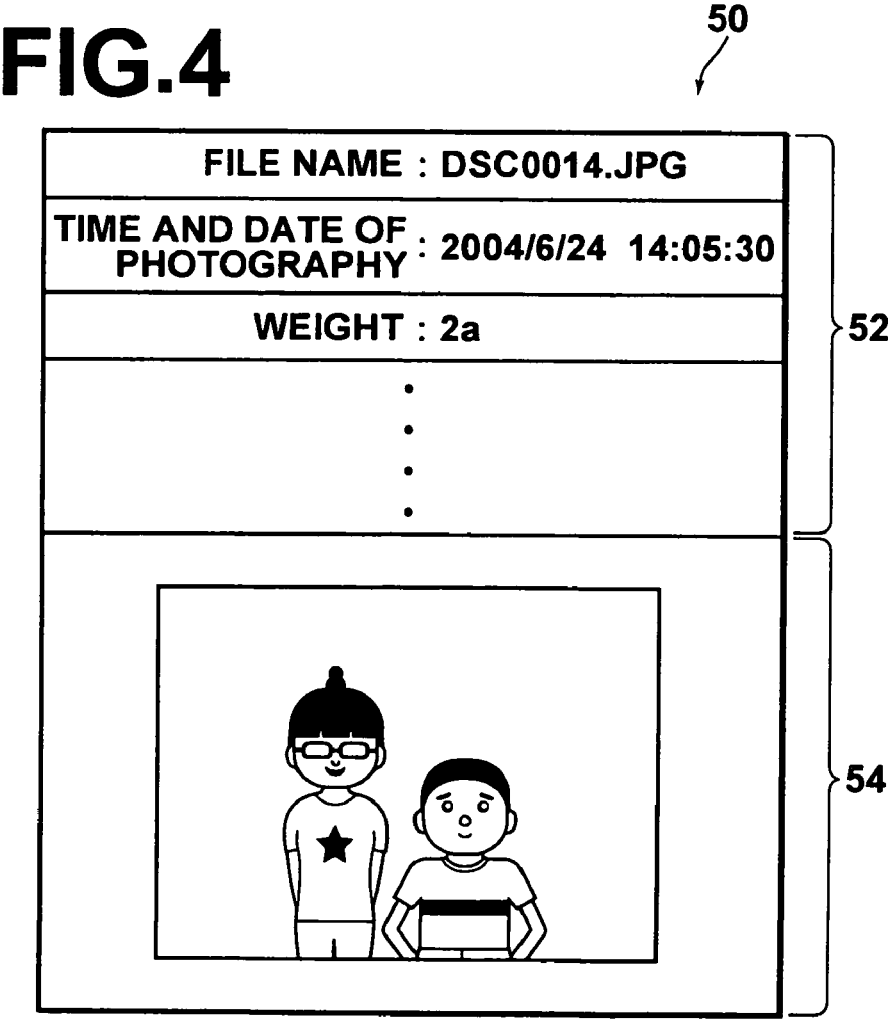
FIG. 3 shows description of time and date of photography of deleted images.
FIG. 4 shows a file structure of an image having a weight described in a tag thereof.

Instead of the hidden files, a text file describing the time and date of photography of the deleted images may be generated as shown in FIG. 3, and stored in the memory card 2 as the deletion information D0.

The weight setting unit 36 sets the weight for each image with reference to the deletion information D0. Since the digital camera 1 allows repeated photography, images stored in the memory card 2 are saved by the user without deletion thereof. Therefore, the images stored in the memory card 2 are important to the user and often include images deleted before photography thereof. Since the user carries out photography again and again for an important image, the number of deleted images becomes larger.

For this reason, the weight setting unit 36 obtains the number of deleted images included within a predetermined time period (such as Y seconds) before the time and date of photography of each of the images stored in the memory card 2, with reference to the deletion information D0. If the number of deleted images is n, the weight setting unit 36 sets the weight as a value found by a×n, and describes the value in a tag of the corresponding image file. In the case where the number of deleted images photographed within a period of Y seconds before the photography time is 0, the weight is also 0.

FIG. 4 shows an image file structure with the weight being described in the tag. As shown in FIG. 4, a file 50 of an image comprises a tag 52 and data 54. In the tag 52 is described various kinds of information including the file name, the time and date of photography, and the weight. In the file 50 shown in FIG. 4, the weight is described as 2 a, which means that the number of deleted images photographed in Y seconds before the photography time of the image is 2.

Figure 5:
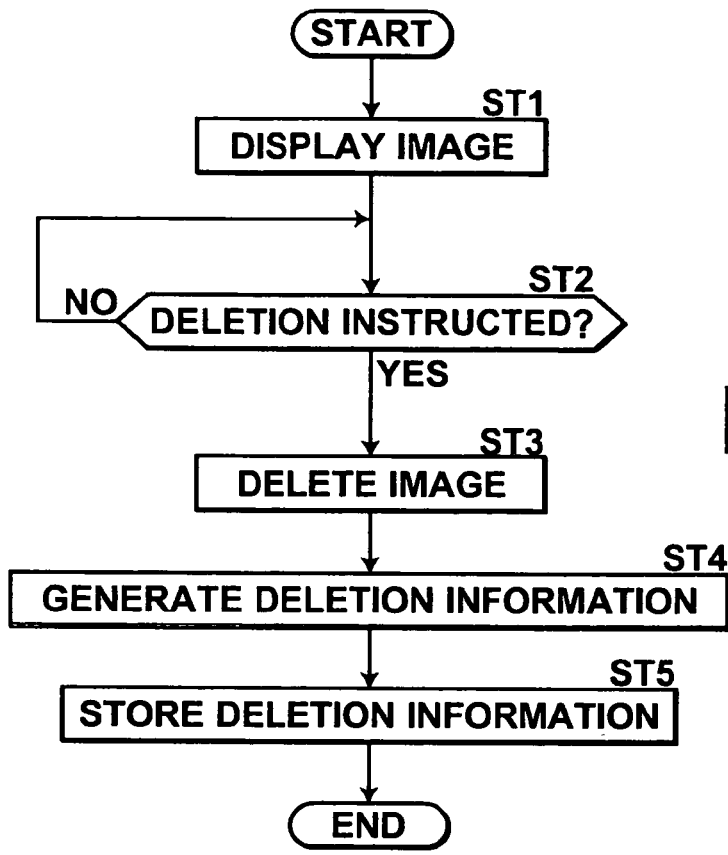
FIG. 5 is a flow chart showing a procedure carried out at the time of generation of the deletion information.

Processing carried out in this embodiment will be described next. FIG. 5 is a flow chart showing a procedure carried out at the time of generation of the deletion information D0. The memory card 2 stores the images obtained by photography. The procedure starts when the user inputs an instruction to display any one of the images stored in the memory card 2 for deletion thereof with use of the input unit 16. The display control unit 20 reads the image to be deleted from the memory card 2, and displays the image on the display unit 18 (Step ST1).

Monitoring is started as to whether the user has input an instruction to delete (Step ST2). If a result at ST2 is affirmative, the memory control unit 30 deletes the image whose deletion has been instructed from the memory card 2 (Step ST3), and the deletion information generation unit 34 generates the deletion information D0 (Step ST4). The deletion information generation unit 34 stores the deletion information D0 in the memory card 2 (Step ST5) to end the procedure.

Figure 6:
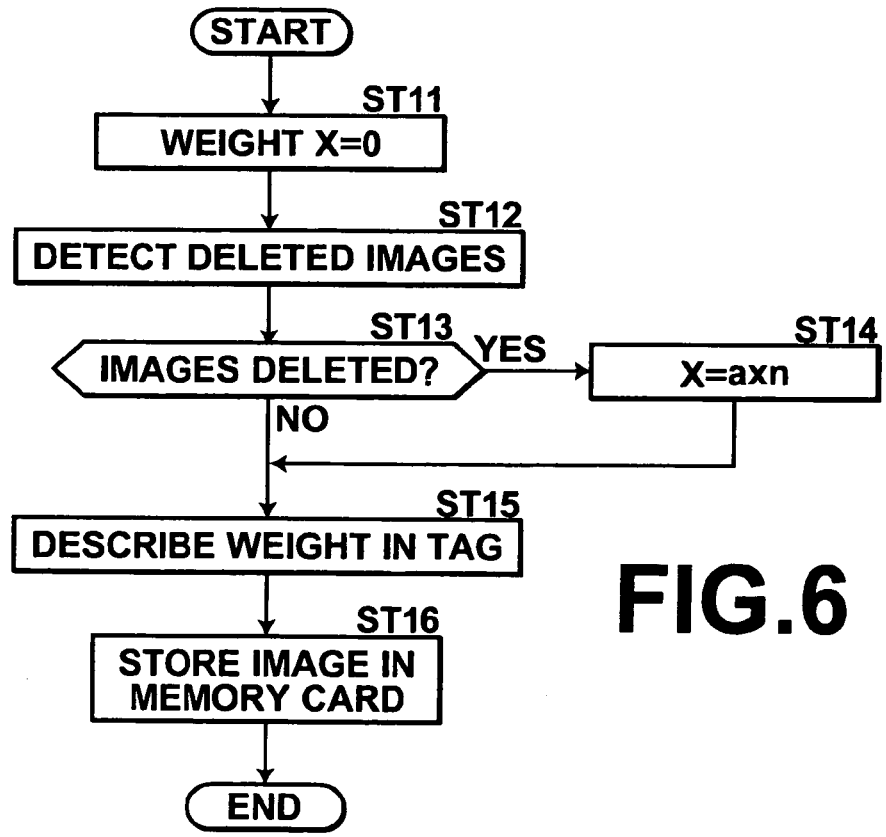
FIG. 6 is a flow chart showing a procedure carried out for setting the weight.

FIG. 6 is a flow chart showing a procedure carried out at the time of setting the weight. The procedure starts when the user presses the shutter button for photography of a subject, and the weight setting unit 36 sets the weight (hereinafter denoted by X) for the image obtained by photography with the imaging unit 24 and compressed by the compression decompression unit 28 to be an initial value 0 (Step ST11). The weight setting unit 36 then refers to the deletion information D0 stored in the memory card 2, and finds the number of deleted images photographed within a period of Y seconds before the time of photography of the image (Step ST12).

The weight setting unit 36 judges whether deletion was carried out in Y seconds (Step ST13), and sets the weight X to be a×n if a result at Step ST13 is affirmative (Step ST14). If the result at Step St13 is negative and after Step ST14, the value of the weight X is described in the tag of the corresponding image file (Step ST15), and the image is stored in the memory card 2 (Step ST16) to end the procedure.

As has been described above, in this embodiment, the deletion information D0 regarding the deleted images is generated and stored in the memory card 2. Therefore, by referring to the deletion information D0 later, how many images have been deleted before and/or after any one of the stored images can be understood. If the number of deleted images is large, it is inferred that the user photographed again and again until he/she was satisfied or that the user selected the best image from images of the same scene. Consequently, by storing and referring to the deletion information D0, the weight for each of the stored images can be set according to the number of deleted images photographed before the time of photography thereof.

Furthermore, by setting the weight according to the number of deleted images photographed before the image and by adding the weight to the image, the weight can also be displayed with the image. Therefore, the user viewing the image can understand the weight and can easily make a decision as to whether a print order needs to be placed regarding the image.

In the embodiment described above, the weight is set by the digital camera 1. However, the weight may be set at the time the images stored in the memory card 2 are transferred to a personal computer of the user. In this case, viewer software installed in the personal computer of the user carries out the procedure for setting the weight. Hereinafter, this procedure will be described.

Figure 7:
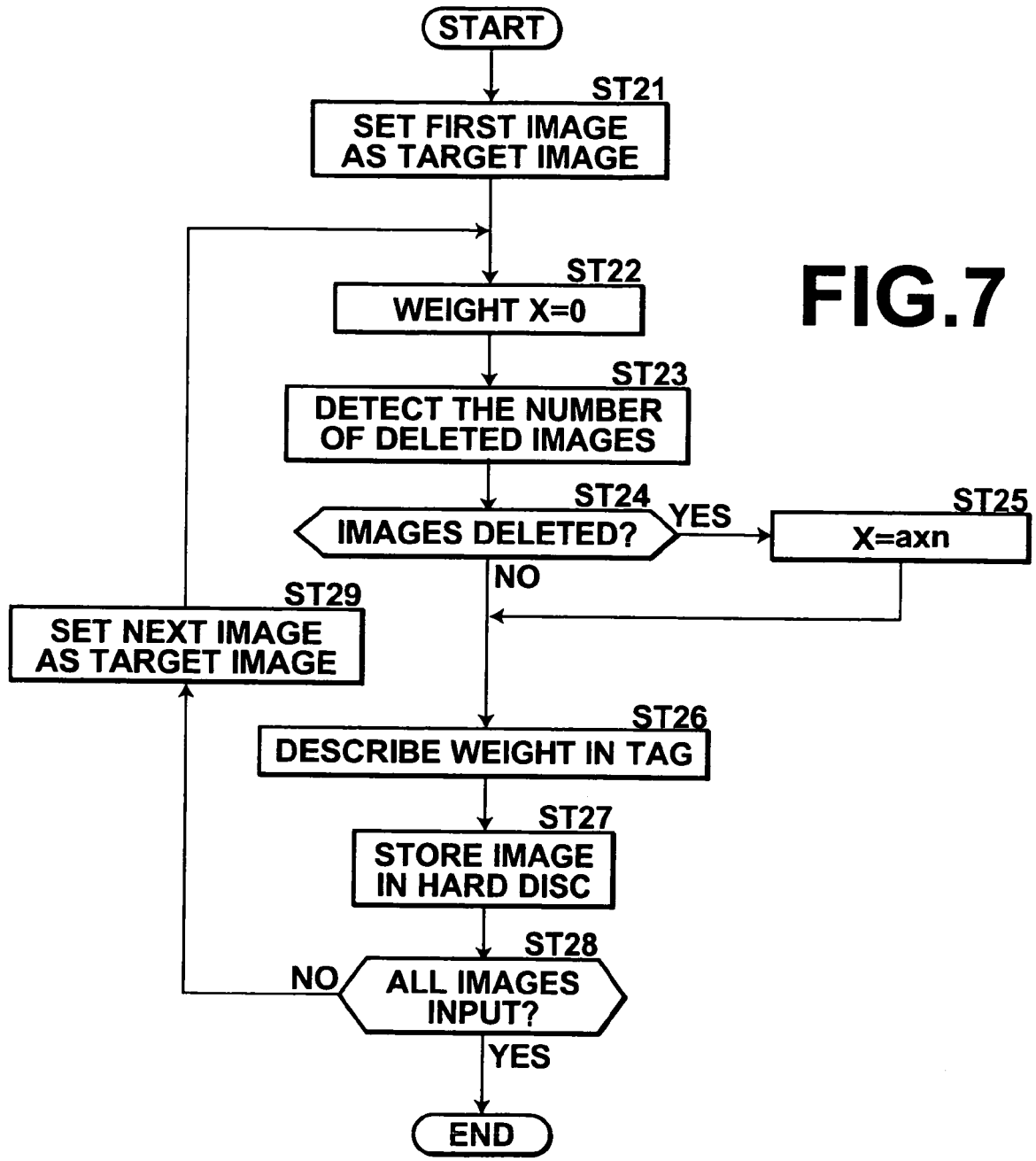
FIG. 7 is a flow chart showing a procedure carried out at the time of transfer of images to a personal computer.

FIG. 7 is a flow chart showing the procedure carried out at the time of input of the images to the personal computer. The procedure starts when the user sets the memory card 2 on the personal computer and inputs an instruction to transfer the images from the memory card 2 with use of the viewer software installed in the personal computer. The first image is set to be a target image of weight setting (Step ST21). The weight X therefor is set to be 0 (Step ST22). The number of deleted images photographed in Y seconds before the time of photography of the target image is detected from the deletion information D0 stored in the memory card 2 (Step ST23).

Whether deletion was carried out is judged (Step ST24). If a result at Step ST24 is affirmative, the weight X is set to be a×n (Step ST25). If the result at Step ST24 is negative and after the Step ST25, the value of the weight X is described in the tag of the corresponding image file (Step ST26), and the image is stored in a hard disc of the personal computer (Step ST27). Whether all the images have been transferred is then judged (Step ST28). If a result at Step ST28 is negative, the next image is set to be the target image (Step ST29). The procedure then returns to Step ST22. If the result at Step ST28 is affirmative, the procedure ends.

In the embodiment described above, the deletion information D0 is generated according to the number of deleted images photographed before the target image. However, the deletion information D0 may be generated according to the number of deleted images photographed after the image or before and after the image.

The weight for each of the images is set according to the number of deleted images, with reference to the deletion information D0 in the above embodiment. However, the image may be judged to be important in the case where the number of deleted images is a predetermined number or larger. Otherwise, the image is judged to be not important. In this case, binary information representing the state of being important or not important is described in the tag.

In the embodiment described above, the digital camera 1 generates the deletion information D0, and stores the information in the memory card 2. The weight is then set based on the deletion information D0. However, the user may display the images obtained with use of the digital camera on the personal computer so that any one of the images can be deleted from the memory card 2 or the hard disc if unnecessary. Therefore, the personal computer may have the functions of the deletion information generation unit 34 and the weight setting unit 36 of the digital camera 1 so that the personal computer can carry out generation of the deletion information D0 and setting of the weight. More specifically, the viewer software installed in the personal computer carries out the same functions as the deletion information generation unit 34 and the weight setting unit 36.

What is claimed is:

1. A photography apparatus, comprising:
   an imaging unit for obtaining an image by photography;
   a storage memory for storing the image;
   an input unit for receiving an instruction to delete the image;
   a memory control unit for deleting the image regarding which the instruction to delete has been received, from the storage memory; and
   a deletion information generation unit for generating deletion information including time and date of photography of the deleted image,
   wherein the deletion information generation unit generates the deletion information as a 0-byte hidden file.

2. The photography apparatus according to claim 1, further comprising a weight setting unit for setting a weight regarding the photographed image according to a number of deleted images photographed before and/or after a time and a date of photography of the image, with reference to the deletion information.

3. A photography apparatus, comprising:
   an imaging unit for obtaining an image by photography;
   a storage memory for storing the image;
   an input unit for receiving an instruction to delete the image;
   a memory control unit for deleting the image regarding which the instruction to delete has been received, from the storage memory;
   a deletion information generation unit for generating deletion information including time and date of photography of the deleted image; and
   a weight setting unit for setting a weight regarding the photographed image according to a number of deleted images photographed before and/or after a time and a date of photography of the image, with reference to the deletion information.

4. The photography apparatus according to claim 3, wherein the weight setting unit sets the weight by multiplying the number of deleted images by a predetermined number.

5. The photography apparatus according to claim 3, wherein the weight setting unit sets the weight regarding the photographed image according to the number of deleted images photographed within a predetermined time period before and/or after the time and date of photography of the image.

6. A weight setting method, comprising:

setting a weight of the image obtained through photography using a photography method, according to a number of deleted images photographed before and/or after the time and date of photography of the image with reference to the deletion information, said photography method comprising:

receiving an instruction to delete an image obtained by photography and stored in a storage memory;

deleting the image regarding which the instruction to delete has been received; and generating deletion information including a time and a date of photography of the deleted image.

7. The weight setting method according to claim 6, wherein the weight is set by multiplying the number of deleted images by a predetermined number.

8. The weight setting method according to claim 6, wherein the weight is set regarding the photographed image according to the number of deleted images photographed within a predetermined time period before and/or after the time and date of photography of the image.

9. A storage medium tangibly embodying a program for causing a computer to execute a weight setting method, comprising:

setting a weight of the image obtained by the program for causing the computer to execute a photography method, according to a number of deleted images photographed before and/or after the time and date of photography of the image with reference to the deletion information, said photography method comprising:

receiving an instruction to delete an image obtained by photography and stored in a storage memory;

deleting the image regarding which the instruction to delete has been received; and generating deletion information including a time and a date of photography of the deleted image.

10. The storage medium tangibly embodying the program for causing the computer to execute a weight setting method according to claim 9, wherein the weight is set by multiplying the number of deleted images by a predetermined number.

11. The storage medium tangibly embodying the program for causing the computer to execute a weight setting method according to claim 9, wherein the weight is set regarding the photographed image according to the number of deleted images photographed within a predetermined time period before and/or after the time and date of photography of the image.

* * * * *